Sept. 12, 1933.  A. ANDREAS  1,926,421
METHOD AND APPARATUS FOR MANUFACTURING PAPER BAGS
Filed Aug. 14, 1930  5 Sheets-Sheet 2

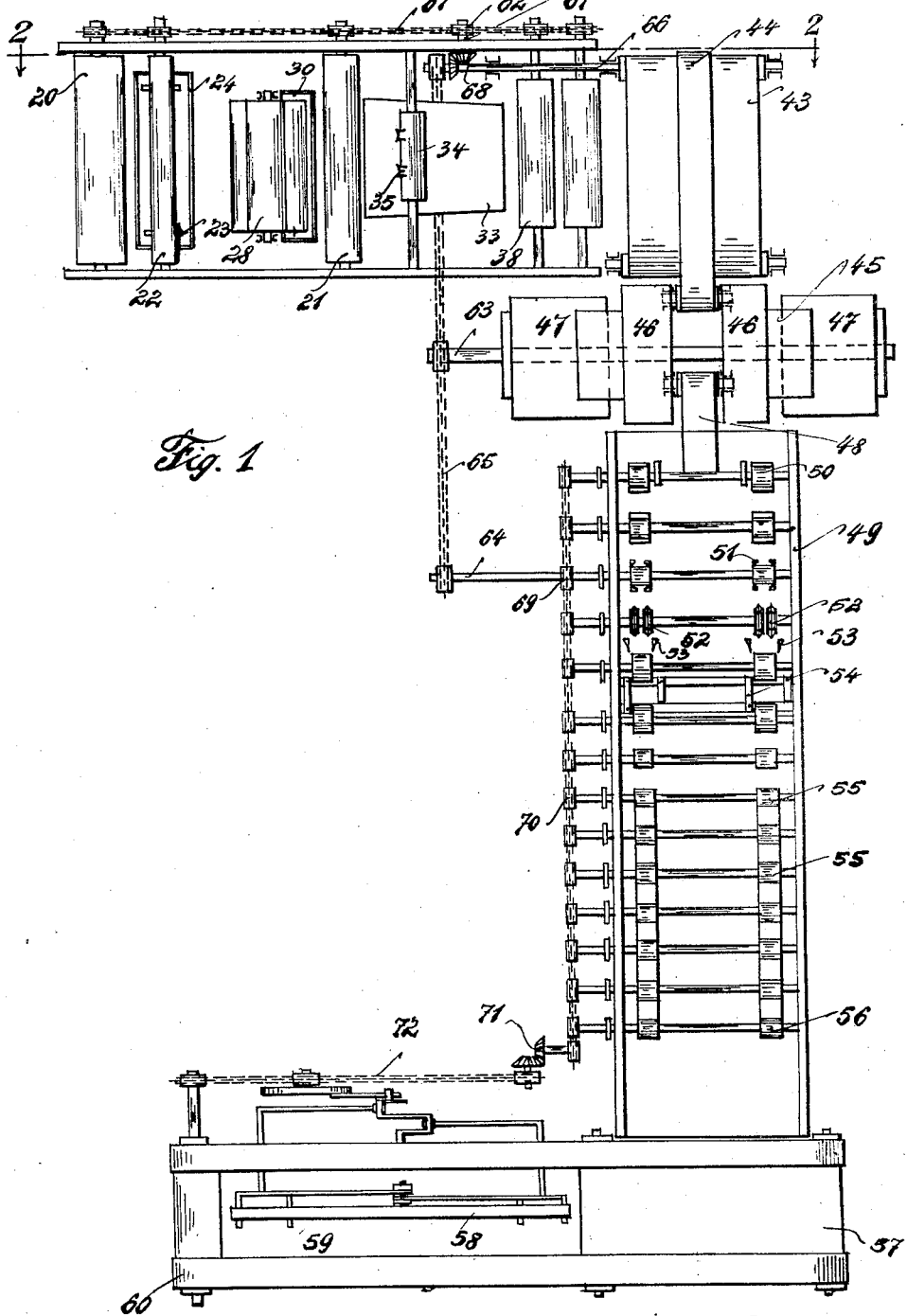

INVENTOR.
Arno Andreas
by
his ATTORNEY.

Sept. 12, 1933.   A. ANDREAS   1,926,421
METHOD AND APPARATUS FOR MANUFACTURING PAPER BAGS
Filed Aug. 14, 1930   5 Sheets-Sheet 3
Fig. 3
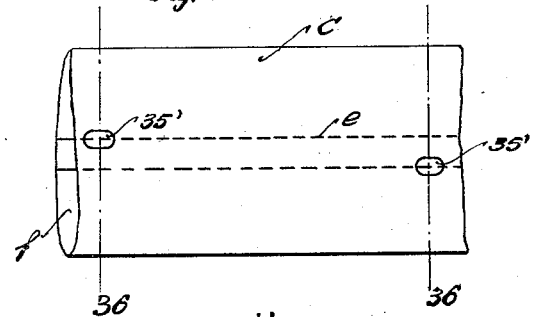
Fig. 4
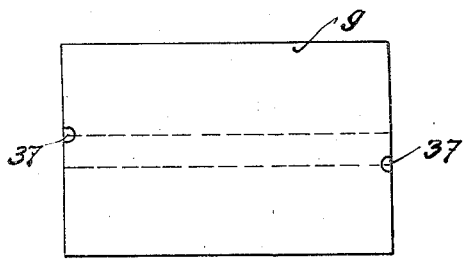
Fig. 5
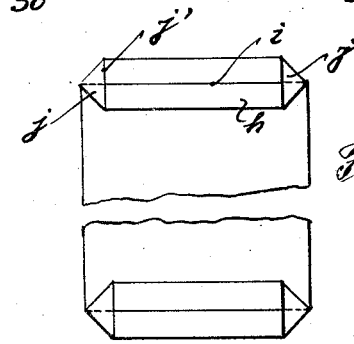
Fig. 6
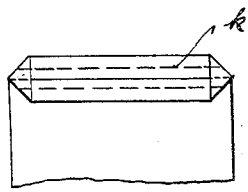
Fig. 7
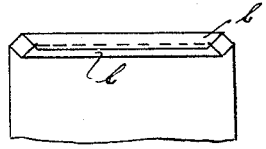
Fig. 8
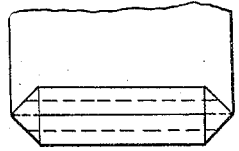
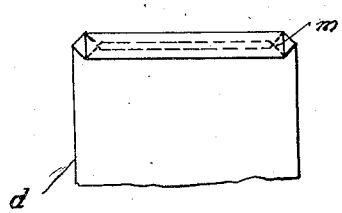
Fig. 9
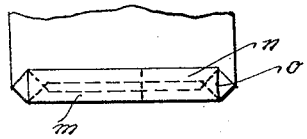
INVENTOR
Arno Andreas.
by his ATTORNEY.

Sept. 12, 1933.  A. ANDREAS  1,926,421
METHOD AND APPARATUS FOR MANUFACTURING PAPER BAGS
Filed Aug. 14, 1930  5 Sheets-Sheet 4

INVENTOR
Arno Andreas.
by
his ATTORNEY.

Sept. 12, 1933. A. ANDREAS 1,926,421
METHOD AND APPARATUS FOR MANUFACTURING PAPER BAGS
Filed Aug. 14, 1930 5 Sheets-Sheet 5
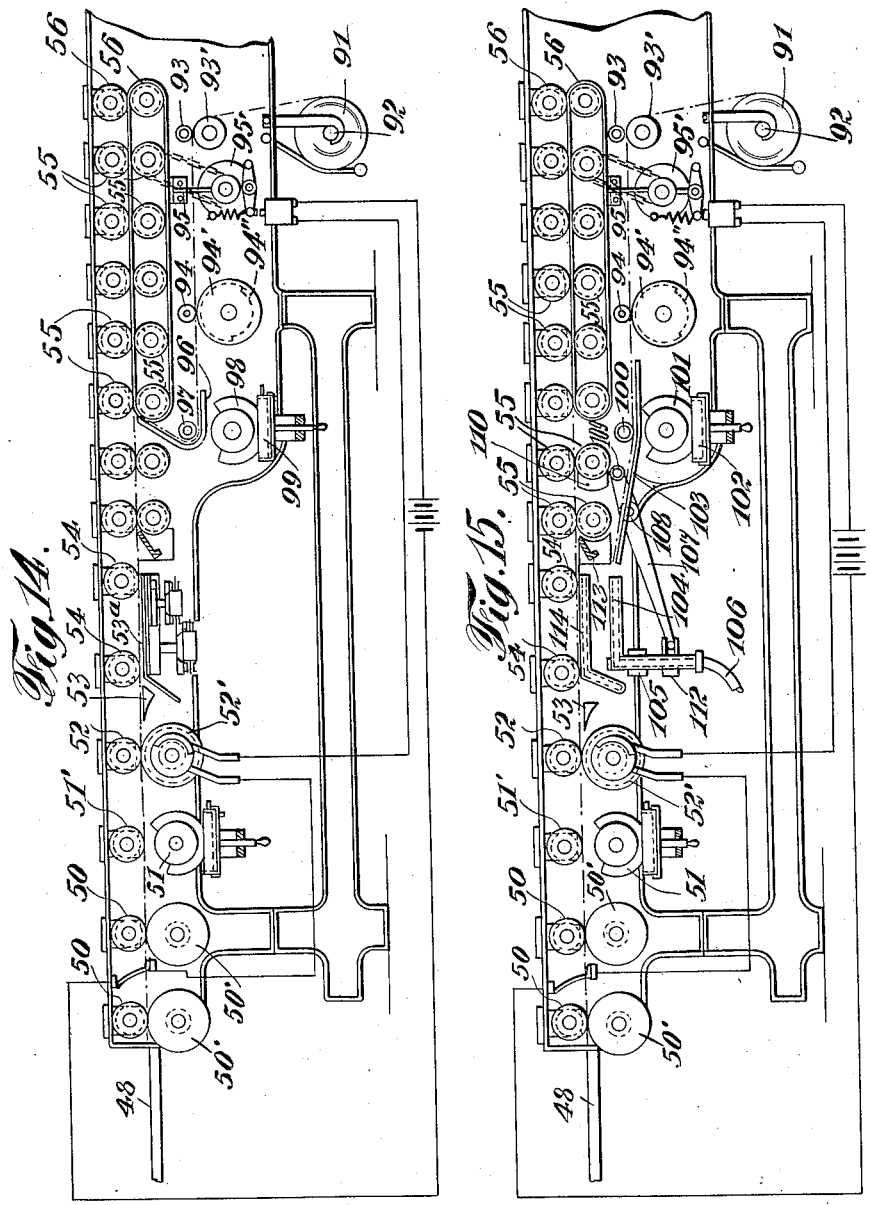
INVENTOR-
*Arno Andreas*
BY *C. P. Goepel.*
-his ATTORNEY- Patented Sept. 12, 1933

1,926,421

UNITED STATES PATENT OFFICE 1,926,421

METHOD AND APPARATUS FOR MANUFACTURING PAPER BAGS

Arno Andreas, Munster, Germany

Application August 14, 1930, Serial No. 475,301, and in Germany August 12, 1929

7 Claims. (Cl. 93—14)

This invention relates to the manufacture of bags, the invention being more particularly related to the manufacture of paper bags of the kind adapted to contain cement, chalk, plaster of Paris, and other materials of a similar character.

Paper bags for the uses referred to are produced from strong and tenacious stock and usually consist, especially for large bags, of several sheets of paper put together in ply arrangement and folded into a flattened tube from which the desired bag lengths are cut. The ends of the cut-off tubular lengths are then crossed by folding the opposite walls defining the open ends so as to produce what may be termed crossed ends. This is accomplished by a pre-folding operation which consists in spreading the opposite end walls in opposite directions from a transverse line, so as to produce end sections including triangular portions whose base edges are parallel and extend transversely across such transverse line. My apparatus for pre-folding the ends in this manner is disclosed in my copending application for Letters Patent of the United States, Serial No. 475,300, filed August 14, 1930.

After the pre-folding operation, sharp creases or fold lines on opposite sides of the mentioned transverse fold and parallel thereto, are provided, and from the creased lines are bent flap portions which are folded and pasted in overlapping relation upon the triangular portions and end sections. Reinforcing strips may then be pasted upon the exterior faces of the overlapping flap portions and at one end of the bag, in order to provide a convenient and satisfactory valve opening, the reinforcing strip may be folded around one end of the flap portions and have an extension thereon which is pasted to the underneath faces of the flap portions. An apparatus for carrying out the final folding and reinforcing operations is disclosed in my copending application for Letters Patent of the United States, Serial No. 475,299, filed August 14, 1930.

My present invention comprehends both a method and means for carrying through accurately and with dispatch the various operations involved in the manufacture of paper bags of the kind described. Commencing with a number of separate continuous sheets of paper, the operations are carried through successively continuously until the finished bags with crossed reinforced ends are produced, and as a final step in the continuous manufacturing procedure, the bags may be counted and secured in bundles. In carrying through the successively continuous operations by means of apparatus as herein referred to, all manual labor is dispensed with, except for the services of one or more watchers for commanding and watching the operations. By my invention, the output of bags is greatly increased and the cost of production is very materially decreased. Furthermore, the bags may be produced in different length sizes, all of which have precisely similar crossed ends, so that the same filling apparatus may be used to fill all of the bags.

The series arrangement of the apparatus for carrying through the continuous and uninterrupted manufacture involves as will appear hereinafter, a number of special features, the purpose and object of which are to improve the mode of operation and practical application of my method.

The principles of the invention and the preferred mode of carrying the same into effect in a practical way will best be understood by referring to the accompanying drawings wherein I have illustrated two embodiments of the invention.

In the accompanying drawings, which are diagrammatical in character:—

Figure 1 represents a schematic plan view of an apparatus for carrying out my invention;

Figure 11:
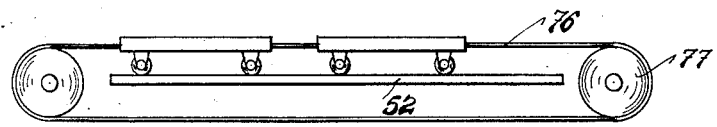
Figure 12:
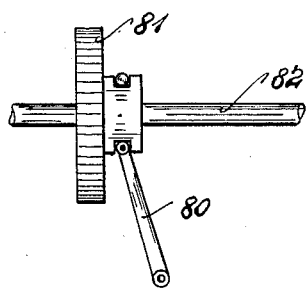
Figure 13:
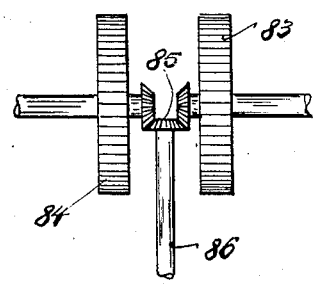
Figure 2:
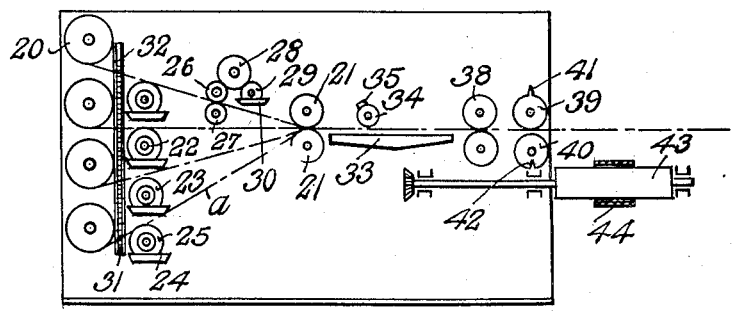
Fig. 2 represents a schematic side elevation on the line 2—2 of Fig. 1 looking in the direction of the arrows associated with said line.
Figure 10:
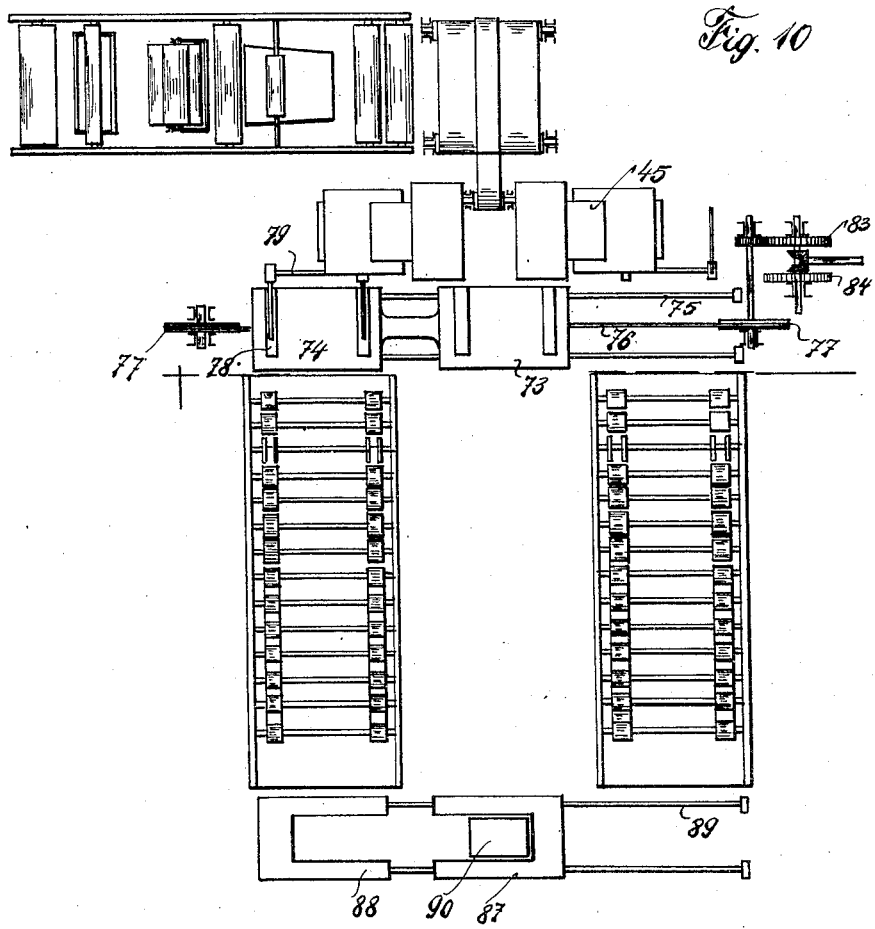

Figs. 3 to 9, inclusive, are fragmentary detail views, showing the bag in progressive stages of manufacture, Fig. 3 being a longitudinal section, while Figs. 4 to 9 are plan views;

Fig. 10 is a view similar to Fig. 1, but showing a different arrangement of some of the parts of the apparatus;

Fig. 11 represents a schematic side elevation, taken on the line 11—11 of Fig. 10;

Figs. 12 and 13 are details of the transmission clutch for operating the wheeled distributing tables;

Fig. 14 is a side elevational view, more or less diagrammatical in character, of the final folding section of the machine with the side frame and gearing connections thereof entirely removed, and illustrating one embodiment of a unit for producing reinforcing strips and applying the same to the flaps of the bags; and Fig. 15 is a similar view, but showing a modified form of the unit for producing and applying the reinforcing strips.

Referring in detail to the drawings, it will be seen that the apparatus for producing the flat folded tubular bag lengths includes a number of superposed supply rolls 20, of which there are four illustrated in the present embodiment, but which in practice may consist of any desired number of supply rolls in accordance with the number of plys to be combined into a single sheet from which the tubular bag lengths are produced. The continuous sheets of paper a, which comprise the supply rolls, are drawn and pressed together to provide a single ply-formed continuous sheet b by means of cooperating feeding and presser rollers 21, 21. To one face of each sheet a, before it is pressed by the rollers 21 to constitute a part of the ply-formed sheet b, is applied a coating of paste or suitable adhesive, so that as the sheets pass between the rollers 21, 21 they will be bonded together. The means for applying paste or adhesive to the faces of the sheets comprises suitable rollers 22 having paste-applying ribs 23 which dip into the paste contained in the receptacles 24. Arranged to apply paste to one of the longitudinal marginal edge portions of the lowermost sheet a is a paste-applying roller 25, located so as to apply the paste to the underneath marginal edge portion of said sheet so as to condition the single ply-formed sheet for bonding in flat folded tubular form. Associated with the top face of the uppermost sheet a is a printing roller 26 with which suitably cooperates a counter roller 27. Said printing roller 26 is designed to print suitable matter upon the outer face of the sheet which ultimately becomes the outer ply portion of the wall c of the completed flat folded ply-formed tube d (Fig. 4). The printing roller 26 receives its ink from an ink distributing roller 28 and an ink-feeding roller 29 which turns in an ink containing vessel 30 supplies the ink to said distributing roller 28. Instead of bonding the sheets together by means of paste or adhesive, suitable staple devices 31 of a common type may be employed for the purpose, such staple devices being supplied through a feeding device 32 of well-known type and being applied to the sheets in a manner well-known in the art so as to be clenched upon the sheets and bind them together by reason of the pressure exerted upon them when passing between the rollers 21, 21. If desired, the stapling devices may also be employed in connection with the paste or adhesive.

The ply-formed sheet b passes from the rollers 21, 21 over a longitudinally extending forming table 33 which may be of any suitable or approved type well known in the art and capable of folding the ply-formed sheet longitudinally into tubular form and so that the longitudinal edge portions of the ply-formed sheet will be overlapped as shown at e (Fig. 4) providing thereby a tubular wall f in opposing relation to the tubular wall c. Operating above the forming table 33 is a roller 34 carrying die-cutters 35, 35 designed to produce elongated openings 35', 35' in the wall c, such openings being spaced apart as shown in Fig. 4 so that when the continuous ply-formed tube is severed into bag lengths, along the transverse lines 36, 36, half openings 37 will appear in the opposite free ends of the wall c (Fig. 5). The purpose of these half openings is to provide clearance spaces in the free edges of the wall c for the passage of catch fingers designed to grip the wall f against plate surfaces in the pre-folding machine as fully illustrated and described in my copending application, Serial No. 475,300 above referred to.

The formed tube is drawn from the forming table by and between a pair of presser rollers 38, 38 by means of which the formed tube is flattened. From the presser rollers 38, 38 the flattened tube passes between the cooperating rollers 39 and 40, of which in the present instance the former is provided with a projecting cutter 41, while the roller 40 has a groove 42 for receiving the cutter. These cooperating rollers operate to sever the continuous flattened tube along the transverse lines 36, 36 so as to provide flattened bag lengths g of equal size. The severed bag lengths g are successively projected onto a conveyer 43 arranged transversely as shown in Fig. 1 so that the bag lengths will fall upon said conveyer in a transverse relation. Cooperating with and operated by the conveyer 43 is a relatively narrow conveyer 44 which extends a distance beyond the delivery end of the conveyer 43 so as to deliver the conveyed bags successively to the pre-folding machine 45. The construction, arrangement, and operation of the pre-folding machine 45 are fully illustrated in my said copending application Serial No. 475,300 to which reference may be had. This machine consists in general of rotary cylinders 46, 46 with which are associated stationary drums 47, 47, the drums being located at the opposite ends of the cylinders as shown. The bag lengths at the opposite ends thereof are successively clamped upon the cylinders 46, 46 so as to be revolved therewith, and said cylinders in connection with their associated drums 47 operate mechanisms which function to pre-fold the opposite open ends of the bag lengths into the pre-folded form shown in Fig. 6. The pre-folding operation results in providing the opposite ends of the bag lengths with end sections h which are spread and flattened in opposite directions from a transverse fold line i, so as to produce triangular portions j whose bases j' are parallel and cross the transverse fold line i. The pre-folding operations are accomplished while the bag lengths are carried upon the cylinders 46 which, before they complete a full revolution, pass the pre-folded bags successively to a pusher device 48 (Fig. 1) for delivery thereby into the final folding machine 49.

In the final folding machine 49, the bags are conveyed with their lengths extending in a direction transversely to the length of the machine, so that both of the pre-folded ends of the bag lengths may be operated upon simultaneously. The bag lengths are fed transversely into the final folding machine by pairs of upper and lower feeding rollers 50, 50'; and the machine involves for operating upon each of the pre-folded ends of the lengths a series of devices comprising paste-applying rollers 51 in cooperation with rollers 51' for applying paste to areas of the triangular portions j; pairs of cooperating creasing rollers 52, 52' adapted to produce sharp creases k (Fig. 7) in the end sections and triangular portions; folding guides 53 for bending flaps l from the crease lines k; and folding mechanism including forming tables 53a over which the bags move with their bent flaps positioned at opposite sides thereof and which function in connection with suitable folding rails (not shown) to fold the flaps into relative positions in which they can be pressed one upon the other upon the end sections as shown in Fig. 8.

The final folding machine 49 further involves means for producing gummed strips and applying the same upon the overlapping flaps as the bags are advanced in the machine; two units being employed for this purpose, arranged one adjacent each side of the machine, since in the present embodiment gummed reinforcing strips are to be applied to the flaps at the opposite ends of each bag. In Fig. 9, I show a strip m applied to the outer faces of the flaps at both ends of the bag, and this strip $m$ at one end of the bag, where the valve opening $o$ is produced, is made with an extension $n$, which, after being passed through the valve opening, is pasted to the inner faces of the flaps. Figs. 14 and 15, illustrate, respectively, the units at the opposite sides of the machine for applying the reinforcing strips $m$, said Fig. 15 illustrating the embodiment for applying the strips having the extensions $n$.

Each of the units includes a supply roll of paper 91 rotatable on an axis shaft 92. A pair of cooperating rollers 93, 93' pulls the ribbon of paper from the supply roll 91 and feeds the same between two roller devices 94, 94' which are operated faster than the rollers 93, 93'. The body of the lower roller 94' is cut away in part as shown at 94'' so that the ribbon will at intervals slide loosely between the rollers 94, 94'.

Prior to reaching the rollers 94, 94', the ribbon passes between the cross cutters 95, 95', where strips of the desired length are severed from the ribbon. As soon as a strip has been cut off, that part of the roller 94' which is not cut away presses the severed strip against roller 94 whereby to cause the severed strip to move with a quick motion over the guide 96 curved around a bearing roller 97. Said guide 96 has a portion which extends upwardly and rearwardly in such manner that the moving strip will be led to contact in flatwise relation with the down-turned faces of the flaps, so that with the advancement of the bag the flaps and contacting gummed strip will move together between a pair of presser rollers 55. Adjacent the bearing roller 97, each passing strip is engaged by a paste-applying roller 98 which dips steadily into paste contained in the receptacle 99, whereby to furnish the strip with adhesive for attachment to the flaps when it is brought into contact therewith. In this way, reinforcing strips $m$ may be severed from a ribbon, furnished with paste, and finally applied to the faces of the flaps $l$ to be pasted tightly thereon as the bag advances between the presser rollers 55.

In the exemplification shown in Fig. 15, the ribbon is drawn in the same manner as hereinbefore described, from a supply roller 91 by the feeding rollers 93, 93' so that the ribbon will be severed by the cross cutters 95, 95'. From the rollers 94, 94' the severed strip passes between a bearing roller 100 and paste-applying roller 101 which dips into paste contained in the receptacle 102. In this case, a guide 103 extends upwardly and forwardly to feed the strip upon a vertically movable table 104. In this case, also, the feeding rollers 93, 93' are operated at a faster rate of speed than the corresponding rollers in the constructional form of Fig. 14, so that the cutters 95, 95' will cut off a reinforcing strip of a length including the extension $n$. Said table 104 has a stem or shank slidably mounted in a guide 105. This table is of the vacuum type and has connected therewith an air conduit 106. As soon as the severed strip reaches its position on the vacuum table, a control device (not shown, but which may consist of any vacuum device as commonly employed on paper handling machines) is operated to produce a suction draft for retaining the strip upon the table. Said table 104 is elevated by means of a lever 107, fulcrumed at 108 and having at its power-receiving end a roller 109 which cooperates with a cam 110 on one of the lower rolls 55. At its opposite end, the lever 107 is connected through a suitable lost-motion link 112 with the shank of the table.

During the upward movement of the table 104, the strip will pull away from the guide 103 and pass along the folding edge 113 whereby the portion $n$ of the strip which is held on the table is bent angularly with respect to the body of the strip. Thereupon the table 104 presses the portion $n$ against the lower side of forming table 114 over which the bag passes in the same manner as described in connection with forming table $53a$. In this case, the table 114 is of the vacuum type, operated in such manner that as soon as the strip is pressed against the underside of the table, it will be held there by vacuum action. Thereupon the vacuum action in table 104 is interrupted and this table is lowered, with the result that the strip clings with its elevated end upon the underside of the table 114, while its main portion as bent by the edge 113 rests on the guide 103. The folding mechanism associated with the table 114, folds the flaps $l$ over and upon the extension $n$ held underneath the table 114. The strip, thus having a portion thereof secured to the flaps, moves along with the moving bag so that by the time the bag reaches the roller pair 55, the main portion of the strip which slides over the guide 103 will be applied to the outer faces of the flaps. Suitable means for operating the moving parts of the units for producing and applying the reinforcing strips, and as well the construction, arrangement and mode of operation of the associated instrumentalities embodied in the final folding machine, are illustrated and described in my copending application, Serial No. 475,299, it being intended in this application to show only in a general way suitable apparatus for folding flaps and applying thereto reinforcing strips in accordance with the steps involved in my improved method for manufacturing paper bags having crossed reinforced ends.

The bag lengths, in final folded form and with the reinforcing strips applied to the flaps thereof, are successively pressed in the machine 49 by the series of sets of presser rollers 55 and are subsequently successively discharged by the discharging rollers 56.

From the discharge rollers 56 the bags are delivered upon an intermittently operated conveying band 57 between the operations of which the bags are permitted to accumulate in pre-determined numbers for bundling. By the conveying band each accumulated bundle is carried upon a tie-strip 58 which is applied to secure the bundle of bags together in well-known manner by closing the scissors device 59. Then by a further movement of the conveying band 57 the tied bundles are discharged at the delivery end 60. The device for tying and delivering the bags in bundles may be of any suitable type, for instance, such as is commonly employed in counting and tying newspapers in bundles.

All the working parts of the machine are operated in timed correlation so that there is a continuous manufacturing operation from the unwinding of the separate sheets of paper from the supply rolls to the delivery of the bundled bags at the delivery end 60 of the conveying band 57. Any suitable arrangement of the transmission mechanism may be provided for effecting the desired timed movement of the various working parts. In the present embodiment, I show diagrammatically, a sprocket driving chain 61 connected with sprocket gears 62 which are applied to the various shafts for operating the paste-applying wheels, printing wheels, feeding rollers, die cutters, presser rollers and cutting devices whereby the various operations are performed for completing the bag lengths for discharge upon the conveyer 43. The driving shaft 63 of the pre-folding machine is operated in conjunction with a main driving shaft 64 for the final folding machine by a sprocket chain 65 which receives its power from a driving shaft 66 by means of which the conveyer 43 is operated. In the present instance the said shaft 66 is operated from the driving chain 61 through a shaft 67 and connected pinion 68. The various parts comprising the working instrumentalities of the final folding machine 49 are operated from the shaft 64 by means of suitable chain and sprocket drives 69 and 70. Movement from the driving chain 70 is transmitted for the operation of the bundling device through connected gears 71 and a sprocket chain drive 72.

The operation of the final folding machine 49 cannot be speeded up to meet the capacity of the pre-folding machine 45 owing to the time required in preparing and pasting the reinforcing strips upon the folded ends of the bags. Therefore, in order to make the fullest use of the pre-folding machine, I may provide, as shown in Fig. 10, two final folding machines 49 for use in connection with one pre-folding machine 45. Under this arrangement, I provide connected wheeled tables 73 and 74 which run upon track rails 75 for delivering the pre-folded bags alternately to the two final folding machines. As best shown in Fig. 11, the connected tables 73 and 74 are operated by an endless chain 76 mounted upon suitable wheels 77. This arrangement is such that while a bag is being delivered from the pre-folding machine upon the table 73, a pre-delivered bag will be moved from the table 74 into the final folding machine at the left-hand end of the track; and conversely, when a pre-folded bag is being delivered upon the table 74 a pre-delivered bag will be delivered from the table 73 into the final folding machine at the right-hand end of the track 75. Suitable means 78, operated by the rock shafts 79, deliver the bags from the tables into the final folding machine. Said rock shafts 79 are operated by the pre-folding machine. As shown in Fig. 12, one of the rock shafts carries a crank arm 80 which is connected with a gear 81 shiftable upon a shaft 82. Arranged to be engaged by the gear 81 are two driving gears 83 and 84 which are operated in opposite directions by pinion connections 85 from a main driving shaft 86 (Fig. 13). The shaft 82, whereon the shiftable gear 81 is mounted, constitutes the driving shaft for one of the wheels 77 whereby to move the chain 76. By this arrangement, it will be manifest that when the shiftable gear is in connection with one of the driving gears, the wheeled tables will be moved into the position shown in Fig. 10, whereas when said shiftable gear is in engagement with the other driving wheel, the tables will be moved in the opposite direction. The main driving shaft 86 may be operated from any suitable part either of the pre-folding machine or of the final folding machine and by any suitable transmission adapted properly to coordinate the alternating movements of the tables with the rate at which the pre-folded bags are discharged from the pre-folding machine.

As shown in Fig. 10, at the delivery ends of the two final folding machines I provide two wheeled tables 87 and 88 which travel upon rails 89. These wheeled tables receive the bags as they are discharged from their final folding machines and operate alternately to carry the bags to a central binding device 90 where the bags are bundled and discharged by any suitable mechanism.

In carrying out my invention, two pre-folding devices as 45 may be provided together with suitable alternating conveyer mechanisms for delivering the successive bag lengths first to one pre-folding device and then to the other one.

While I have illustrated and described my invention as comprising a particular mode of treatment and as taking certain selected embodiments, it will be understood that changes and alterations may be made in the particular details set forth and in the particular arrangement of the parts without departing from the spirit of the invention, and hence I do not wish to limit myself to the particular details set forth or the particular arrangements shown, but consider myself at liberty to make such changes and alterations as fairly come within the scope of the appended claims.

I claim:—

1. In the method of manufacturing paper bags, the steps which comprise supplying continuous sheets, moving the same into flatwise contact one with the other in ply arrangement to produce a ply-formed sheet, applying adhesive substance to the faces which are to contact prior to their contact one with another, folding the ply-formed sheet longitudinally to provide a tube, subjecting the tube to pressure from opposite sides thereof so as to produce opposing walls flattended one upon the other, severing the flattened tube into bag lengths, and prior to the severing operations, cutting elongated openings in one wall of the tube at intervals corresponding to the lines of severance and where the lines of severance will intersect said openings so as to produce a notch in each end of one wall of each severed length, said steps being successively continuous from supplying said sheets to producing severed bag lengths having a notch in each end of one wall thereof.

2. A plant for carrying through the manufacture of paper bags having crossed ends, comprising in combination means for bonding together a plurality of sheets to provide a ply-formed sheet, means for folding the ply-formed sheet longitudinally and pressing it into a flattened tube, means for severing the flattened tube into bag lengths, a pre-folding machine and means for conveying the severed lengths successively thereto, said pre-folding machine being adapted to carry out the successive pre-folding of the bag lengths to produce at the ends thereof spread end sections and triangular portions overlying said end sections in crossing relation, a final folding machine and means for feeding the pre-folded bags successively thereto, said final folding machine being adapted to carry through the final folding of the pre-folded bag lengths to produce flaps from the end sections and triangular portions and to fold such flaps upon the same, said final folding machine further operating to paste reinforcing strips upon the folded flaps, said operation being carried through successively continuous in the aforementioned order to provide a manufacturing operation in continuity.

3. In a plant for the continuous manufacture of paper bags having crossed ends, operating apparatus for producing ply-formed flattened tubular bag lengths, a machine for producing on the ends of the bag lengths pre-folded ends consisting of triangular portions flattened in crossing relation upon said spread end sections, a machine for final folding the pre-folded ends and operating to fold flaps from the triangular portions and end sections and press the flaps into flat overlying relation upon said triangular portions and end sections and including means for pasting reinforcing strips upon the flattened flaps, conveying means for the bag lengths between said apparatus and the pre-folding machine, and between the pre-folding machine and final folding machine, and means for coordinating the speed of said apparatus, prefolding and final folding machines and of each of said conveying means, whereby to provide a continuous operation of the plant to produce final folded bags successively continuously.

4. The method of manufacturing paper bags having crossed reinforced ends, the steps which comprise supplying continuous sheets, bonding the sheets together to produce a ply-formed sheet, folding the ply-formed sheet longitudinally and pressing it into a flat folded tube, severing the tubes into bag lengths, subjecting the bag lengths individually and successively to creasing and folding operations to produce crossed ends comprising overlapping flaps lapping over spread end sections and triangular corner portions which connect the end sections, then attaching reinforcing strips to the overlapping flaps, said steps being successively continuous from supplying the sheets to the attachment of the reinforcing strips.

5. In the manufacture of paper bags having crossed reinforced ends, the method of advancing without interruption flat folded tubes individually and successively through successive steps comprising pre-folding the ends of the bags to produce end sections connected by overlying triangular corner portions, forming from the prefolded ends, overlapping flaps which overlap the end sections and triangular corner portions, and attaching reinforcing strips to the overlapping flaps.

6. In the manufacture of paper bags having crossed reinforced ends, the method of advancing without interruption flat folded tubes individually and successively through successive steps comprising pre-folding the ends of the bags, with each end formed into end sections extending transversely of the bag and connected by overlying triangular corner portions, preparing flaps from the sections by creasing the sections lengthwise and across the corner portions, folding the flaps into overlapping relation, and attaching reinforcing strips to both the inner and outer faces of the overlapping flaps.

7. The method of manufacturing paper bags having crossed reinforced ends, the steps which comprise advancing sheets together and bonding them together to produce a ply-formed sheet, advancing the ply-formed sheet while folding it longitudinally and pressing it into a flat folded tube, advancing the tube while severing it into bag lengths, advancing the bag lengths individually and successively while pre-folding the ends thereof to produce spread end sections which extend transversely of the bag and are connected by overlying triangular corner portions, continuing to advance the bag lengths while preparing flaps from the sections by creasing the sections lengthwise and across the corner portions, continuing the advance while folding the flaps into overlapping relation, and still continuing the advance while attaching reinforcing strips to the overlapping flaps, the advancing operations for the steps being carried through successively and continuously and without interruption.

ARNO ANDREAS.